Patented Dec. 13, 1949

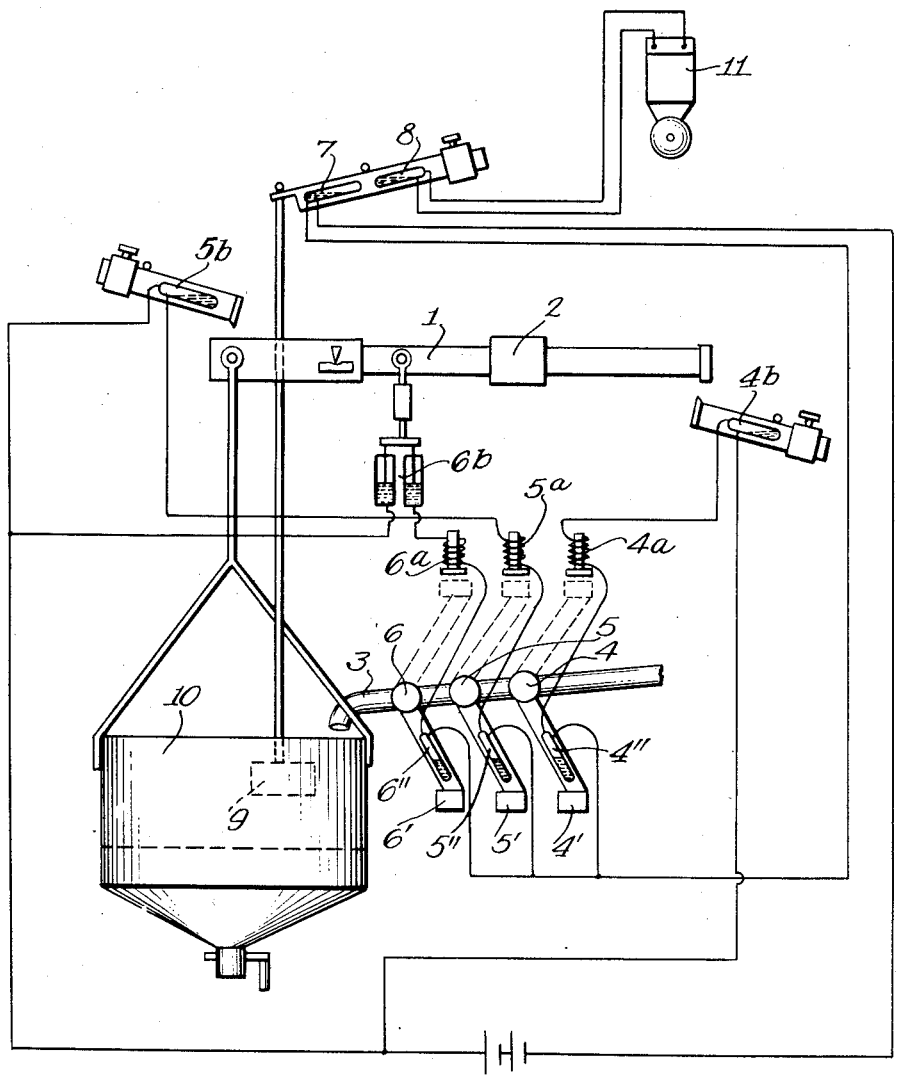

2,491,049

UNITED STATES PATENT OFFICE 2,491,049

AUTOMATIC SCALE FOR THE WEIGHING OF POURED-OUT SUBSTANCES

Magnus Kristoffer Johannessen, Bergen, Norway

Application May 18, 1946, Serial No. 670,790
In Norway May 12, 1941

1 Claim. (Cl. 249—2)

This invention relates to an automatic scale for the weighing of poured-out substances, especially liquids, and particularly to one in which the scale beam, after the quantity intended to be weighed has been poured into a balance receptacle, begins to tilt from its unbalanced position and thereby closes the outlet of a cock.

In such pouring scales, especially such for fluids, in which large quantities are to be tapped off and weighed, it is necessary, in order to allow of the weighing to be effected relatively quickly, for the outlet of the cock to have a considerable sectional area. The height of fall and the dynamic pressure of the fluid against the measuring container will therefore give rise to a merely approximate weighing.

The purpose of the present invention is to avoid this inconvenience; the invention refers preferably to a device or automatic scale for weighing liquids, the scale being of the kind in which the lever affects cocks which are progressively brought into action step by step and which cause a throttling of the outlet of the fluid slightly before the full amount is weighed off. The principal characteristics of the invention consists in that the throttling cocks and the final cut-off cocks are under the influence of electro-magnets and are kept in the open position by the electro-magnets, which latter are coupled in electrical connection with one electric switch each, which, by successive stages, are influenced by the tilting of the scale beam from its unbalanced position, so that the switches interrupt by degrees the passage of the electric current through the electro-magnets, whereby the cocks come by stages into activity and partly throttle the stream of the fluid, until the intended mass is reached, and then the outlet of fluid is cut off by the final cut-off cock.

Further characteristics of the invention are revealed in the following description and in the attached drawing, which shows in diagram the form of execution of the subject of the invention with electric control and dis-connection of the various necessary switchings.

In the form of the invention illustrated, I indicates the ordinary scale with weight 2. 3 represents the outlet of the fluid, which outlet is fitted with three cocks 4, 5 and 6. Each of these cocks is fitted with a swivel 4', 5' and 6', in which there is located a mercury switch or other kind of switch 4'', 5'' or 6'', which, when the cock swivel stands obliquely upwards (i. e. in the position in which the appropriate cock is open), serves for the switching in of the electric current, and when the swivel stands obliquely downwards (i. e. in the position in which the appropriate cock is partly or entirely switched off), serves for the switching off of the electric current. At the extreme end, each cock swivel is provided with a weight in the form of an armature of soft iron. When the arms are manually swung to open the cocks, the electromagnets are energized and thereby keep the cocks open. When the current flowing through the electromagnet (by the means hereinafter described) is switched off, the weights bring down the cocks to a full or partial closing position.

The cock 4 is so arranged that it throttles down the outlet from full sectional area to, for instance, a half or less when the current in the electro-magnet $4a$ is switched off and the swivel 4' falls by its own weight. The cock 5 is so arranged that it throttles the flow of fluid to a thin stream, whilst on the other hand the cock 6 completely cuts off the flow.

The scale beam along which the weight 2 is moved affects a mercury switch $4b$, which is provided with a counter weight, so that normally (i. e. when the scale beam hangs quite horizontally and is not drawn downwards by its weight), the said switch cuts off the current flowing to the electromagnet $4a$. Further, this end of the scale beam affects another switch $6b$, which normally cuts out the current to the electro-magnet $6a$. The opposite end of the scale beam affects a switch $5b$, which is fitted with a counter weight and which normally cuts off the current to the electro-magnet $5a$.

When the scale beam is in its balanced position the switches $4b$, $5b$ and $6b$ break the circuits to the respective electro-magnets. When the scale beam is tilted following removal of the weighed liquid from the receptacle 10, the switches $6b$, $5b$ and $4b$ are successively closed. Thereafter the circuits to the electro-magnets are closed by swinging the appropriate cock arms to their upper positions, whereby the switches 4'', 5'' and 6'' are tilted to close said circuits.

In order that the final or cut-off cock 6 shall be brought into action at the appropriate moment, the usual type of switch, in which mercury in a closed tube is made to bridge contacts by tilting the tube, cannot be used. The type of mercury switch $6b$ which is here used comprises a vessel or tube containing mercury and an adjustable needle which is displaceable towards and away from the mercury. As shown, the switch preferably consists of two such tubes and two adjustable needles, the latter being connected to the scale beam and displaced to enter the mercury in the cups at the appropriate moment in the rocking movement of the scale beam.

As a safety device there is also provided a double-acting mercury switch 7, 8, which is under the influence of a float 9, which hangs down into the container 10 slightly below its upper brim. The switch 7 serves as a master switch, as it is switched in series with all the other switches and is normally held in the switched-in position by the weight of the float. The switch 8 is connected with the signal apparatus 11, and is normally switched off. Both the switches are mounted on a tipping device, so that when one of them is switched in the other is switched off, and vice versa.

The method of working is as follows:

The weight 2 is determined by the quantity that has to be tapped off and weighed, for instance, 100 kgs.

When the weighing receptacle is empty, the weight 2 rocks the beam so that its right-hand portion actuates the switches 4b and 6b, whereby the latter are closed. At the same time, the left-hand portion of the beam is moved upwardly and closes the switch 5b.

Thereafter the three cock arms 4', 5' and 6' are swung manually to their upper (open) positions shown in broken lines, whereby the switches 4", 5" and 6" are also closed and complete the circuit to the electro-magnets 4a, 5a, 6a, so that these are magnetised and hold the cock arms in the open position. When an ordinary manually operated cock (not shown) provided in the delivery pipe 3 is opened, the liquid flows into the receptacle 10.

When the intended quantity is nearly reached, in the present case about 95 kgs., the scale beam approaches so nearly to the horizontal position that the switch 4b is no longer influenced, but finds itself tipped upwards by its own weight, so that the current through the electro-magnet 4a is interrupted. Thereby the cock swivel 4' falls and partially closes the fluid outlet, with the consequence that the fluid begins to flow more slowly. The degree of reduction of the outlet of fluid may be regulated according to the degree of viscosity of the fluids to be tapped off. Not until the intended weight is approximately reached (in the present case, for instance, 99 kgs.) is the switch 5b cut out, thus interrupting the current in the electromagnet 5a, so that the cock swivel 5' falls down and still further throttles the outlet, whereby only a mere thin stream passes through it. When the intended weight is fully reached and the lever arm stands quite horizontal, the switch 6b cut off the current from the electro-magnet, 6a, so that the cock swivel falls down and thus completely cuts off the flow of liquid.

The point of time for the actuation of the switches 4b and 5b can be regulated by means of the counter weights provided. The switch 6b, which must be more sensitive than the other two switches, is regulated by an adjusting screw.

It is apparent that the illustrations shown above have been given solely by way of illustration and not by way of limitation and that the above examples are subject to wide variations and modifications within the scope of the appended claim. All subject variations and modifications are to be included within the scope of the present invention.

What I claim is:

An automatic feed scale for the weighing of granular and liquid materials in predetermined quantities having a balance beam, a plurality of electro-magnetic-operated pivotable cocks, a switch for each of said cocks and actuated by said balance beam for progressively and step by step closing the outlet for the material to be weighed; characterized by a weight on the end of each of said pivotable cocks and urging said cocks downward into closed position, each of said weights having an armature, a plurality of electro-magnetic means on said scale one for each of said cocks and disposed to coact with its armature when said cocks are raised, each of said electro-magnetic means and the armature of the corresponding cock being connected in series with one of said switches to maintain said weight raised and said cock in open position when said switch is closed and to permit said weight to fall and turn its cock to the closed position when said switch is opened by the titling of said balance beam.

MAGNUS KRISTOFFER JOHANNESSEN.

REFERENCES CITED

The following references are of record in the file of this patent:

UNITED STATES PATENTS

| Number | Name | Date |
|---|---|---|
| Re. 13,074 | Leinert | Jan. 4, 1910 |
| 788,945 | Roberts | May 2, 1905 |
| 931,344 | Roberts | Aug. 17, 1909 |
| 1,169,003 | Burkhardt | Jan. 18, 1916 |
| 1,178,727 | Jones | Apr. 11, 1916 |
| 1,449,153 | Spurrier | Mar. 20, 1923 |
| 1,846,148 | Rumpf | Feb. 23, 1932 |
| 2,009,691 | Grist | July 30, 1935 |

FOREIGN PATENTS

| Number | Country | Date |
|---|---|---|
| 155,271 | Great Britain | Aug. 4, 1921 |